(12) United States Patent
Meier et al.

(10) Patent No.: US 9,798,924 B2
(45) Date of Patent: Oct. 24, 2017

(54) CONTENT DELINEATION IN DOCUMENT IMAGES

(71) Applicant: Lexmark International, Technology Sarl, Genève (CH)

(72) Inventors: Ralph Meier, Rastede (DE); Johannes Hausmann, Corcelles (CH); Harry Urbschat, Oldenburg (DE); Thorsten Wanschura, Oldenburg (DE)

(73) Assignee: KOFAX INTERNATIONAL SWITZERLAND SARL, Geneva (CH)

( * ) Notice: Subject to any disclaimer, the term of this patent is extended or adjusted under 35 U.S.C. 154(b) by 134 days.

(21) Appl. No.: 14/827,725

(22) Filed: Aug. 17, 2015

(65) Prior Publication Data
US 2017/0053163 A1 Feb. 23, 2017

(51) Int. Cl.
*G06K 9/00* (2006.01)
*G06K 9/46* (2006.01)
(Continued)

(52) U.S. Cl.
CPC ....... *G06K 9/00449* (2013.01); *G06K 9/4647* (2013.01); *G06K 9/527* (2013.01); *G06K 9/6857* (2013.01)

(58) Field of Classification Search
CPC ........... G06K 9/00442; G06K 9/00456; G06K 9/4642; G06K 9/4647; G06K 9/52;
(Continued)

(56) References Cited

U.S. PATENT DOCUMENTS

2007/0002375 A1* 1/2007 Ng ............................... 358/1.18
2009/0274363 A1* 11/2009 Dai ............................... 382/164
(Continued)

OTHER PUBLICATIONS

Sethasopon, San; Lursinsap, Chidchanok; Sophatsathit, Peraphon; An Algorithm for Identifying, Extracting and Converting Document Image Table Structures into LaTeX Format; Advanced Virtual and Intelligent Computing Center, Department of Mathematics, Faculty of Science, Chulalongkorn University, Bangkok Thailand (date unknown).
(Continued)

*Primary Examiner* — Andrew W Johns
(74) *Attorney, Agent, or Firm* — Zilka-Kotab, P.C.

(57) ABSTRACT

Methods and apparatus delineate grouped together content in documents. Void and unvoid pixels in document images get clustered together. Execution of a histogram and auto-correlation function, including peak detection, against the unvoid clusters reveals the content. Techniques for clustering include iteratively transforming an original image into secondary images with a Haar wavelet transformation, for example. Clustering begins on a lowest image plane and advances to a next highest plane until all void and unvoid pixels in the images are grouped. Void clusters at lower levels remain void clusters at higher levels, thus only unvoid clusters of pixels require processing at higher levels thereby optimizing processing. Imaging devices with scanners define suitable hardware for transformation of the document into images and processors with executable code cluster together pixels to delineate content. Further processing includes executing OCR or other routines post void/unvoid analysis.

20 Claims, 6 Drawing Sheets

(51) Int. Cl.
*G06K 9/52* (2006.01)
*G06K 9/68* (2006.01)

(58) Field of Classification Search
CPC .... G06K 9/522; G06K 9/6218; G06K 9/6219; G06K 9/6267; G06K 9/6268; G06T 7/11; G06T 7/136; G06T 7/194; G06T 2207/20016; G06T 2207/30176
See application file for complete search history.

(56) References Cited

U.S. PATENT DOCUMENTS

2013/0259383 A1\* 10/2013 Kondo et al. ............ G06K 9/46
  382/199
2016/0210523 A1\* 7/2016 Abdollahian et al. ... G06K 9/18
  382/165

OTHER PUBLICATIONS

Liang, Yanhui; Wang, Yizhou; Saund, Eric; A Method of Evaluating Table Segmentation Results Based on a Table Image Ground Truther; 2011 International Conference on Document Analysis and Recognition; pp. 247-251.
Wang, Yalin; Phillips, Ihsin; Haralick, Robert; Table Structure Understanding and it's Performance Evaluation; article; 2004 Pattern Recognition Society; pp. 1479-1497.
Wikipedia; Autocorrelation; encyclopedia; Jun. 24, 2015; pp. 1-8.
Wikipedia; Haar Wavelet; encyclopedia; Jun. 25, 2015; pp. 1-10.

\* cited by examiner

CONTENT DELINEATION IN DOCUMENT IMAGES

FIELD OF THE EMBODIMENTS

The present disclosure relates to delineating content in documents. It relates further to analyzing patterns of pixels in images. Clustering together void and unvoid pixels typifies the embodiments.

BACKGROUND

To extract content from documents, engines typically execute Optical Character Recognition (OCR) or other routines as is known. Training the engines often requires document templates. When entities receive disparate documents from third parties or documents of a similar type, but with highly variable layout, template training requires lengthy sessions and often produces poor results.

With student transcripts, for example, schools vary from other schools in their arrangement on a document of courses, grades, student information, etc. Even within the same school, transcripts vary in layout between students in that courses differ, grades differ, and student information is unique to each person. Transcripts typify the problem of documents lacking common alignment, common structure, and common hierarchy, despite being of a similar type. Tabular extraction techniques seeking common line breaks, line patterns, cells, headers, etc. are ineffective for discerning content in documents of this type.

Accordingly, a need exists to improve content extraction. The inventors have further identified the need to transform inconsistently arranged documents and seemingly disparate structure into ascertainable structure and groupings of content. They also appreciate making improvements without first executing OCR extraction or other computationally-intensive routines. Since certain hardware devices have scanners or screen capture and resident controllers, the inventors have further identified the goal of executing their techniques as part of executable code for implementation on imaging devices and handheld computing devices. Additional benefits and alternatives are also sought when devising solutions.

SUMMARY

The above and other problems are solved by methods and apparatus teaching delineation of grouped-together content in a document. The embodiments demonstrate the use of multi-scale, hierarchical image processing and subsequent clustering of like pixels to assign labels to tabular content which is useful to identify table stacks, lines, cells, headers, and the like to localize document content for future processing, such as OCR. The embodiments execute a paradigm with the notion that 'white spaces' of documents are relevant to ascertaining content in addition to the actual content.

In a representative embodiment, void and unvoid pixels in document images get clustered together. Execution of a histogram and autocorrelation function, including peak detection, against the unvoid clusters reveals the content. Techniques for clustering include iteratively transforming an original image into secondary images with a Haar wavelet transformation, for example. Clustering begins on a lowest image plane and advances to a next highest plane until all void and unvoid pixels in the images are grouped. Void clusters at lower levels remain void clusters at higher levels, thus only unvoid clusters of pixels require processing at higher levels thereby optimizing processing.

Imaging devices with scanners define suitable hardware for transformation of the document into images, as do mobile devices with captured images. Processor(s) in the hardware execute code to cluster together pixels to delineate content. Further processing may include executing OCR or other routines after void/unvoid analysis. Pixel analysis and marking visited pixels defines still other embodiments.

These and other embodiments are set forth in the description below. Their advantages and features will become readily apparent to skilled artisans. The claims set forth particular limitations.

BRIEF DESCRIPTION OF THE DRAWINGS

FIG. 8 is a representative sample document having undergone processing according to the foregoing.

DETAILED DESCRIPTION OF THE ILLUSTRATED EMBODIMENTS

In the following detailed description, reference is made to the accompanying drawings where like numerals represent like details. The embodiments are described in sufficient detail to enable those skilled in the art to practice the invention. It is to be understood that other embodiments may be utilized and that changes may be made without departing from the scope of the invention. The following detailed description, therefore, is not to be taken in a limiting sense and the scope of the invention is defined only by the appended claims and their equivalents. In accordance with the features of the invention, methods and apparatus delineate grouped-together content in a document and identify tabular or other structure therein.

Figure 1:
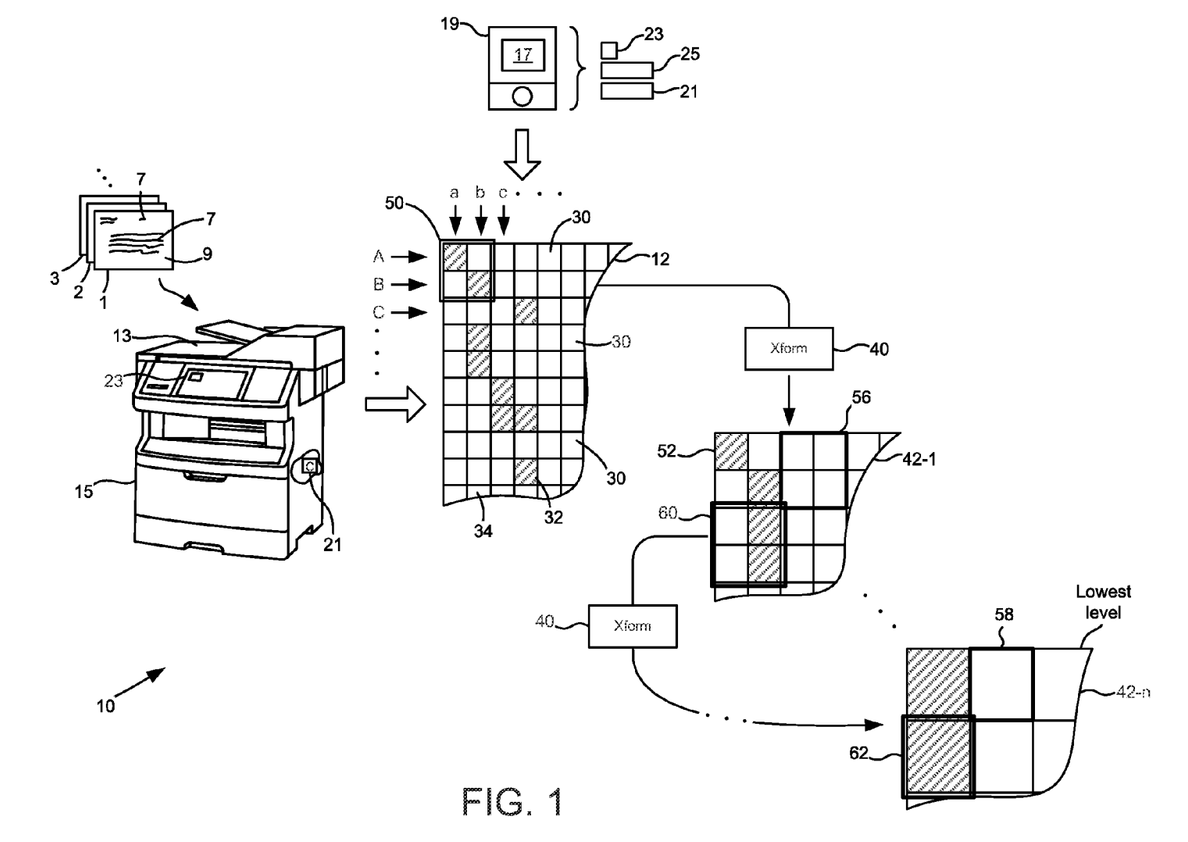
FIG. 1 is a diagram of a computing system environment for conversion of documents to images.

With reference to FIG. 1, a computing system environment 10 includes hard copies of one or more documents, 1, 2, 3 . . . etc. The documents contain information such as text 7 typifying words, numbers, symbols, phrases, etc. relating to the topic of the hard copy. It can also include various colors, advertisements, artwork, corporate logos, watermarks, texture, creases, speckles, stray marks, and the like. The background 9 of the document represents the underlying media on which the content appears. The documents are variety, but contemplate invoices, financial statements, transcripts, business cards, book pages, letters, forms, etc.

Images 12 get created from the documents through techniques such as scanning with a scanner 13 of an imaging device 15 or by taking a picture/screenshot 17 with a mobile device 19, such as a tablet or smart phone. In either, one or more controller(s) 21, such as ASIC(s), microprocessor(s), circuit(s), etc. have executable instructions that act on the images. A user might also invoke a computing application 23 for capturing the image of which is installed and hosted on the controller and/or operating system 25. Alternatively, the images can be obtained from archives, such as might be stored on a storage volume (not shown), or that might arrive from an attendant computing device (not shown).

Once captured, the image is processed to delineate content of the document. The content exists in pixels 30 of the image. The quantity of pixels (e.g., rows A, B, C, . . . by columns a, b, c, . . . ) ranges in volume depending upon the resolution of the scan or capture, e.g., 150 dpi/ppi, 300 dpi/ppi, etc. Each pixel has an intensity value defined according to various scales, such as grayscale or color, and a range of 256 possible values is common, e.g., 0-255. The intensity value may be also bi-tonal or binary with a value of black or white, 1 or 0. Conversion schemes are also common to convert ranges of values to binary, such as labeling as black pixels those with relatively dark intensities and white pixels those with light intensities or by other means such as reducing color to 1 bit color. Hereafter, black 32 and white pixels 34 will be used to illustrate the embodiments, but should not be construed as limiting. The pixels are also noted as having avoided filtering, blurring, smearing, or other schemes that may have otherwise diluted their intensity, but such is not required.

After procurement of the original image, one or more secondary images 42-1 . . . 42-$n$ are obtained through the process of image transformation 40. In one embodiment, a Haar wavelet transformation is constructed and executed which recodes a starting, higher level image into a lower level image having fewer pixels (e.g., image 12 is transformed into secondary image 42-1). It is representative to iteratively quarter a pixel size of each preceding image with each transformation. In such circumstances, a starting image is converted into a blocked part that stores the sum of the values in each non-overlapping 2×2 pixel region in the original, and three other parts that encode certain differences. The differences are used to reconstruct the complete original region from the blocked part. For instance, a 2×2 pixel region 50 in the original image becomes transformed into block 52 in the secondary, transformed image 42-1. In turn, the 2×2 pixel regions 56, 60 of image 42-1 become blocks 58, 62 in image 42-$n$, and so on. The blocks can be analogized to a grayscale representation of the original, but half the size of the original (e.g., each 2×2 pixel region gets transformed into a 1×1 block). Ultimately, a 2560×3328 grid of pixels in an original image can be transformed into a 10×13 block of pixels in a secondary image in seven iterations that can, in reverse, facilitate reconstruction of the original. Of course, other transformation schemes are possible.

Figure 2:
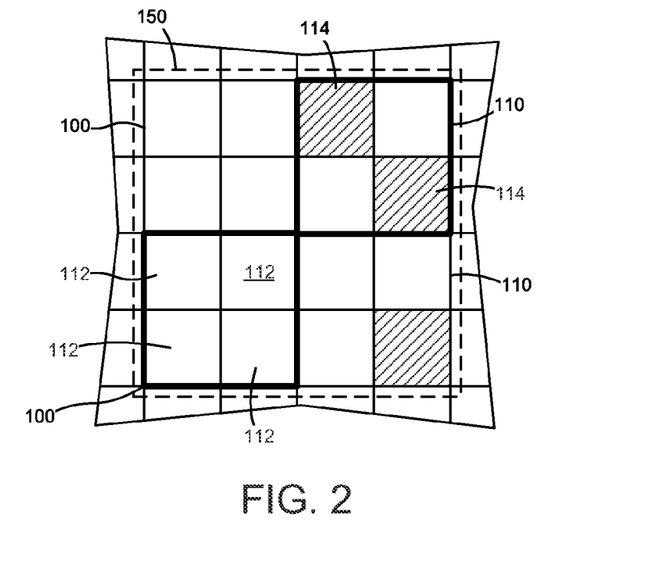
FIG. 2 is a diagram of void and unvoid pixels in an image and clusters.

With reference to FIG. 2, groups of pixels can be clustered together in any of the original or secondary images of FIG. 1. In one embodiment, 2×2 groups of pixels are clustered together as either void clusters of pixels 100 or unvoid clusters of pixels 110. A void cluster contains only void pixels 112, while an unvoid cluster contains one or more unvoid pixels 114. A void pixel, in turn, defines a pixel in an image whose value equals zero, whereas all other pixels not equal to zero are defined as unvoid pixels. In turn, a void cluster has an entirety of pixels in the cluster with values equal to zero, whose summation of pixel values also equals zero, whereas an unvoid cluster has at least one pixel with a value not equal to zero and its summation is greater than zero.

Figure 3A:
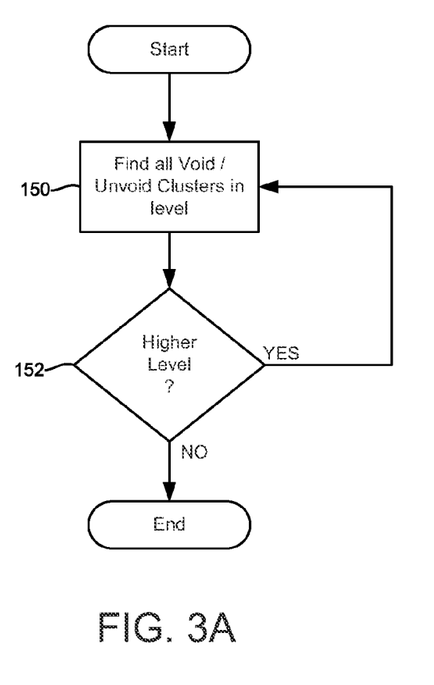
FIGS. 3A and 3B are flow charts showing processing of void/unvoid clusters of pixels.
Figure 4A:
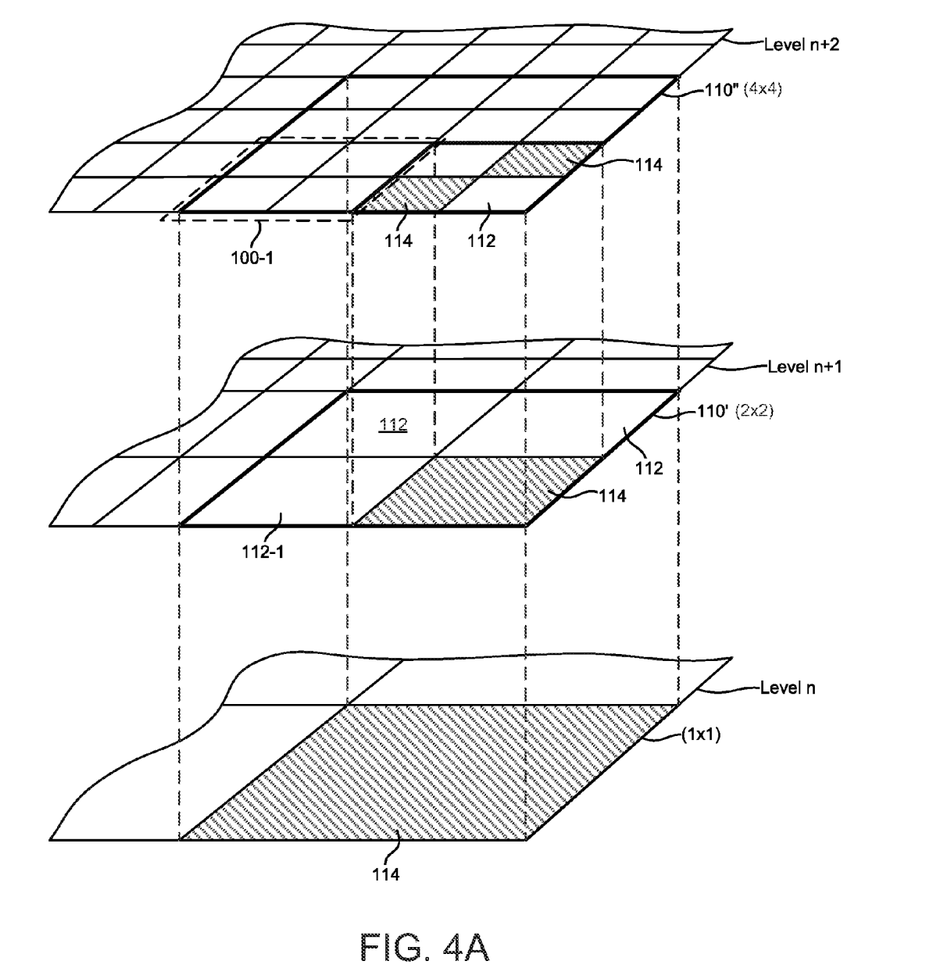
FIGS. 4A and 4B are diagrams of unvoid and void clusters at various image levels.
Figure 4B:
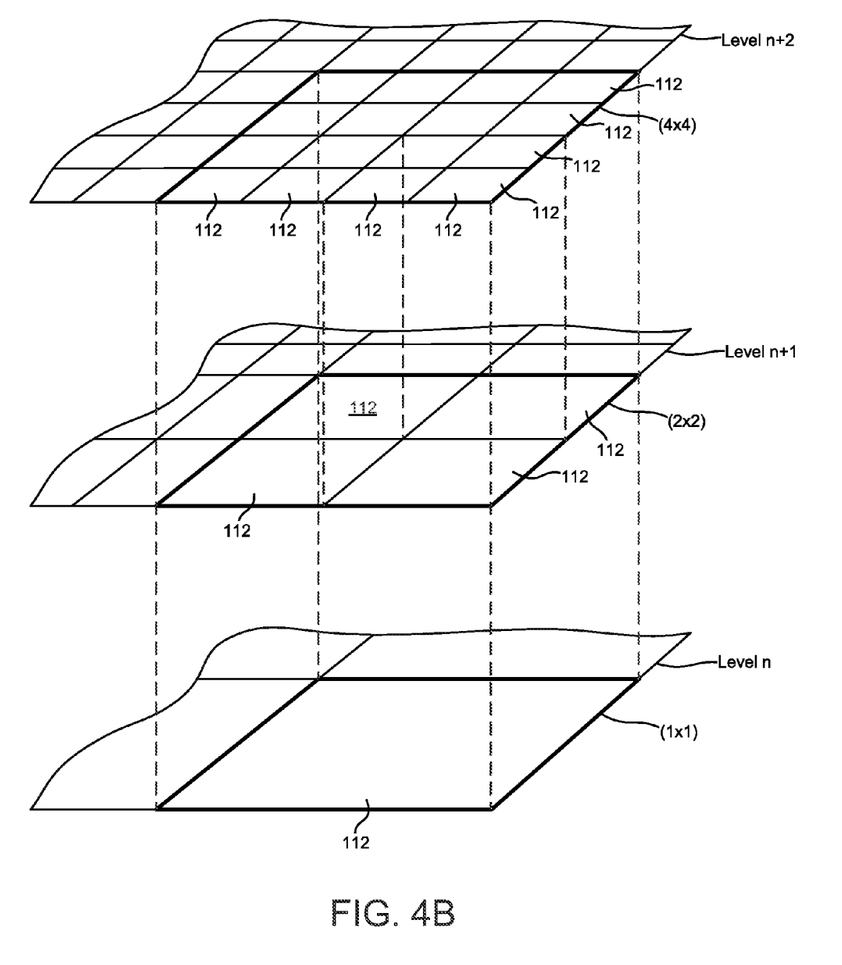

With reference to FIG. 3A, processing commences by clustering together all void and all unvoid pixels in a lowest level image plane, 150, and repeating for a next higher level of image plane, if any, 152, until all such clusters are gathered for the document images. As seen in FIGS. 4A and 4B, a low level image plane, n, is obtained through transformation of a higher level image, n+1, as described in FIG. 1. Similarly, image level n+1 is obtained through transformation of a higher level image n+2, and so on. Void pixels 112 in one image plane correspond to void clusters of pixels in all higher image planes, per definition, (e.g., the 1×1 block in image level n corresponds to a cluster of void pixels 2×2 in image level n+1, and it also corresponds to a cluster of void pixels 4×4 in image level n+2). Unvoid pixels 114 at image level n, in contrast, have pixels in the 2×2 cluster 110' at a next higher image level n+1 that correspond to unvoid pixels 114, but may also correspond to void pixels 112, per definition. In turn, the cluster 110' of unvoid pixels at image level n+1 corresponds to a 4×4 cluster 110" at the next higher image level n+2 and contains unvoid pixels 114, and perhaps one or more void pixels 112 as shown. But since a void block at a lower level must also corresponds to a cluster of void pixels at a higher level, per definition, block 112-1 at image level n+1, for instance, corresponds to a 2×2 cluster of void pixels 100-1 (dashed line) at the next higher image level n+2, despite 4×4 cluster 110" having both void and unvoid pixels. This notion extends throughout all the image planes although only three planes n, n+1 and n+2 have bee noted. This can also be seen in FIG. 2 in planar view. Namely, the unvoid pixel 150 at level n disintegrates into a cluster of two void pixels and a cluster of two unvoid pixels at level n+1. At level n+2, the unvoid pixels of level n+1 disintegrate into two clusters (comprising two and one unvoid pixels), and five void pixels. The latter are all connected (cf. FIG. 6) to the void cluster of level n+1, thus at level n+2 there is a single void cluster comprising two level n+1 and five level n+2 void pixels.

Figure 3B:
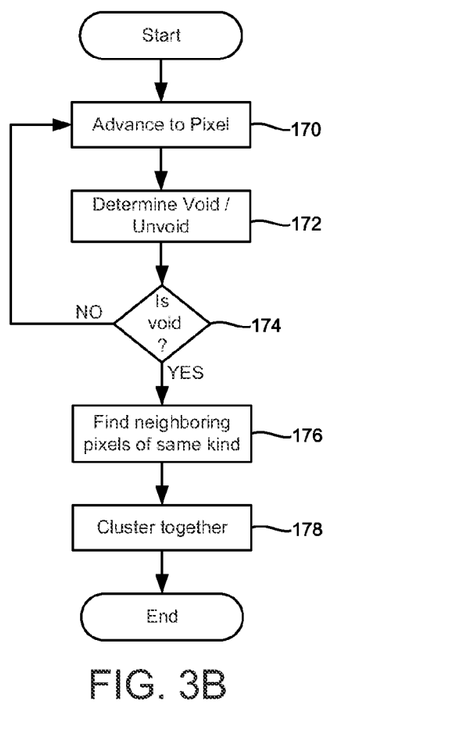
Figure 6:
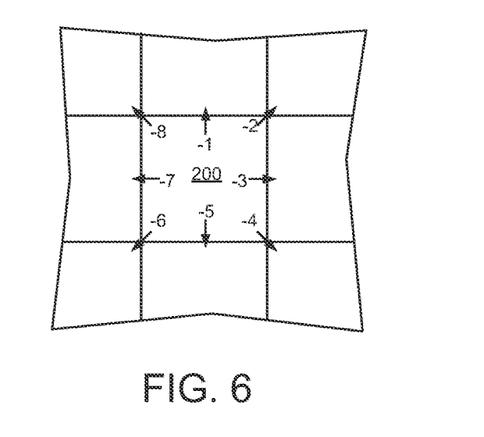
FIG. 6 is a diagram of processing individual pixels on an image plane of any image scale.

In any given plane, clustering begins by searching for a first void pixel as noted in FIG. 3B. Upon advancement to a pixel 170, it is determined whether or not that pixel is void or unvoid 172. If void, 174, neighboring pixels of the same kind of are gathered, 176, and clustered together 178. As seen in FIG. 6, this occurs by examining the eight pixels (−1, −2, −3, −4, −5, −6, −7, −8) adjacent to void pixel 200 to see whether they too are void or unvoid. If also void, they become clustered together into a larger group of void pixels. Execution takes place by examining the pixels from pixel −1 to pixel −8 (top, top-right, right, right-bottom, bottom, bottom-left, left, and top-left). On the other hand, if no void pixel is found at 174. FIG. 3B, next pixels are iteratively examined until the first void pixel is found. Of course, other schemes are possible.

Figure 5:
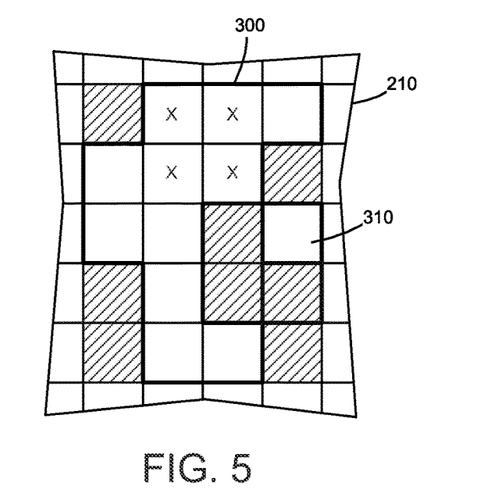
FIG. 5 is a diagram of void and unvoid clusters on an image of any image scale.

One result of clustering can be seen diagrammatically in FIG. 5 for any given image plane 210. A large cluster of void pixels is noted as 300, whereas a smallest cluster is noted as 310. To avoid confusion and maintain a systematic order of processing, pixels examined during clustering get marked as having been visited so as to avoid duplicate processing. Pixels marked with an 'x' have been visited. The mark actually encodes the void (or unvoid) cluster number the pixel belongs to, or a special value to indicate that it is a new (un)void pixel that has not been visited yet (which requires some extra care). But through this scheme, artisans can nicely handle merging of both void and unvoid clusters, as well as efficiently determining their edges, if required.

Skilled artisans should now appreciate that an original image of 2560×3328 pixels (having a total of 8,519,680 total pixels) can be transformed into a lower level image plane of 10×13 pixels having a total of 130 pixels. In turn, by conducting processing first on this lower level, only 130 pixels need be examined for void or unvoid pixel intensity values and clustered together. Instead of examining 8,519,680 pixels, processing on this plane executes very quickly. Proceeding to the next highest image level, there are 20×26 pixels for a total of 520 total pixels (or 10×13 by 2×2). Owning to the property of void pixels remaining larger clusters of void pixels at the next higher image plane, e.g., FIG. 4B or the relationship between 112-1 and 100-1 in FIG. 4A, the process of clustering together pixels of a same kind only requires investigation regarding the unvoid clusters of pixels. Thus, despite 520 total pixels existing in the 20×26 image level, not all 520 pixels will require visiting, again speeding processing. As before, all the void pixels at level n are also void at level n+1, as are the void pixels at n+1 remaining void pixels at the image level n+2 (FIG. 4B), and so on. Conversely, unvoid pixels at image level n may or may not remain wholly unvoid pixels at the next highest image level n+1. Examining unvoid pixels at the next highest image level only requires determining whether they disintegrate into one or more void pixels, e.g., 112-1, FIG. 4A, and marking them as such. Then, neighboring void pixels are examined as in FIG. 3B.

Figure 7:
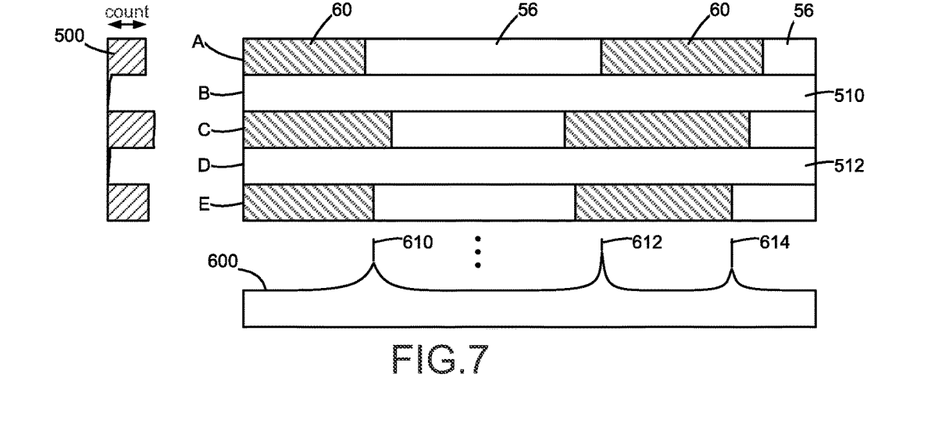
FIG. 7 is a diagram of a histogram and corresponding autocorrelation function for unvoid clusters whose results delineate content in images.

Once the pixels are clustered at their devised image level, FIG. 7 notes the execution of a histogram function 500 against the clusters of unvoid pixels 60. It is representative to count the numbers of unvoid clusters per a given row of pixels (A, B, C, D, E, etc.) and show that count in the histogram 500. Rows A, C and E in the example have positive counts in the histogram, whereas rows B and D do not as they illustrate blank lines in a document between rows of content. Next, an autocorrelation function 600 is executed relative to the histogram. As many autocorrelation functions exist in the field of statistics, many known techniques can be used here. Once done, relative peaks 610, 612, 614 are noted in the function. As known with peak detection algorithms, the peaks indicate periodicities in the histogram and are processed to determine structural information in the underlying document, e.g., delineation of blocks of 'white space' from areas where text or other marks are found.

Actual results of executing the foregoing is seen in FIG. 8 as performed on the sample document 800 (e.g., student transcript). The histograms 500-1, 500-2 are applied along different axes of the document and they each have an autocorrelation function 600-1, 600-2 applied thereto, respectively. The relative peaks 610-1, 610-2 of their respective autocorrelation functions delineate various blocks of content in the document. Some of the identifiable blocks in the transcript are noted at 810 for a relatively large block of content noting course subject names, requirements and grade computation, 820 for course identifier numerals, 830 for course subject names, and 840 for subheadings of course grades, for instance. Other peaks are shown and their content is viewable in the document, but without numerals designating them because of space constraints in the figure. Of course, the process can be applied at multiple scales of resolution. It can be also applied iteratively to produce a hierarchy of structural information in the document, for example, from stacks to tables to table lines and cells to words to characters, etc. The total number of applications depends upon a user's desired granularity of delineating content.

Once done, the results of the structural analysis can be submitted for further processing. For transcripts, this could include the automatic comparison of courses and grades taken between different students who applied for one school with the aim to choose first the most qualified students for admission. For other documents, such as bills of lading, the results can be compared back to the order and/or checked against labels for hazardous or other materials and which kind of material. Again, these examples shall not be understood in a limiting way.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments. All quality assessments made herein need not be executed in total and can be done individually or in combination with one or more of the others.

The invention claimed is:

1. A method of identifying content in a document, comprising:
    receiving at a processor of a computing device an image corresponding to the document;
    transforming the image into one or more secondary images each having pluralities of pixels;
    determining void and unvoid pixels in the one or more secondary images and grouping together pluralities of the void pixels and unvoid pixels to form void clusters and unvoid clusters;
    determining a histogram for the unvoid clusters; and
    executing an autocorrelation function relative to the histogram and detecting relative peaks thereof, thereby delineating grouped together content in the document.

2. The method of claim 1, wherein the transforming the image further includes executing a Haar wavelet transformation to represent the image with fewer pixels.

3. The method of claim 2, further including iteratively executing the Haar wavelet transformation to obtain the one or more secondary images.

4. The method of claim 1, wherein the transforming the image further includes iteratively quartering a pixel size of each preceding image.

5. The method of claim 1, wherein the transforming the image occurs without optical character recognition, blurring, filtering or smearing of the image.

6. The method of claim 1, further including defining a threshold intensity value for the void and unvoid pixels.

7. The method of claim 6, wherein the void pixels and the unvoid pixels are either binary white or black pixels.

8. The method of claim 7, wherein the void clusters have no black pixels.

9. The method of claim 1, further including determining whether a given pixel in the one or more secondary images is one of the void or unvoid pixels and finding neighboring pixels of a same pixel intensity when forming the void and unvoid clusters.

10. A method of indicating content in a document, comprising:
    receiving at a processor of a computing device an original image corresponding to the document;
    iteratively transforming the original image into a plurality of secondary images each having pluralities of pixels of a pixel size lesser than each preceding image, the secondary images corresponding to image levels from high to low levels, the original image being a highest image level;
    determining void and unvoid pixels at one of the image levels corresponding to one of the secondary images and clustering together pluralities of the void pixels and unvoid pixels to form void clusters and unvoid clusters in said one of the image levels;

advancing to a next highest image level and a determining void and unvoid pixels at said next highest image level and further clustering together pluralities of the void pixels and unvoid pixels to form void clusters and unvoid clusters in said next highest imaging level, the further clustering together only occurring for the pixels in the next highest image level corresponding to the unvoid clusters in a lower image level;

determining a histogram for the unvoid clusters; and executing an autocorrelation function relative to the histogram and detecting relative peaks thereof, thereby delineating grouped together content in the document.

11. The method of claim 10, wherein the transforming the original image further includes executing a Haar wavelet transformation.

12. The method of claim 11, further including iteratively executing the Haar wavelet transformation to obtain the one or more secondary images.

13. The method of claim 10, wherein the transforming the original image further includes iteratively quartering a pixel size of each preceding image.

14. The method of claim 10, wherein the transforming the original image occurs without optical character recognition, blurring, filtering or smearing of the original image.

15. The method of claim 10, further including defining a threshold intensity value for the void and unvoid pixels.

16. The method of claim 15, further including defining the threshold intensity value as either binary white or black.

17. The method of claim 16, wherein the clustering together accumulates no black pixels in the void clusters.

18. The method of claim 10, further including determining whether a given pixel in the one or more secondary images is one of the void or unvoid pixels and finding adjacent pixels of a same pixel intensity when forming the void and unvoid clusters.

19. The method of claim 10, further including conducting optical character recognition after said clustering together.

20. An imaging device, comprising:

a scanner for converting a document into an image; and a controller in communication with the scanner, the controller configured to:

receive the image;

transform the image into one or more secondary images each having pluralities of pixels;

determine void and unvoid pixels in the one or more secondary images and group together pluralities of the void pixels and unvoid pixels to form void clusters and unvoid clusters;

determine a histogram for the unvoid clusters in one of the images; and execute an autocorrelation function relative to the histogram and detect relative peaks thereof, thereby delineating grouped together content in the document.

* * * * *